United States Patent [19]

Neeff et al.

[11] 3,753,645
[45] Aug. 21, 1973

[54] CONTINUOUS DYEING OF POLYESTER FIBERS WITH WATER-IMMISCIBLE HALOGENATED HYDROCARBONS AND AMINO ANTHRAQUINONE DYESTUFFS

[75] Inventors: Rutger Neeff, Leverkusen; Peter Wegner, Cologne; Volker Hederich, Cologne; Robert Kuth, Cologne, all of Germany

[73] Assignee: Bayer Aktiengesellschaft, Leverkusen, Germany

[22] Filed: July 30, 1970

[21] Appl. No.: 59,727

[30] Foreign Application Priority Data
Aug. 6, 1969 Germany............... P 19 39 897.1

[52] U.S. Cl............................. 8/39, 8/25, 8/94, 260/372, 260/378, 260/380, 260/381
[51] Int. Cl....... C09b 1/02, C09b 1/16, C09b 1/56, D06p 1/20
[58] Field of Search ............... 8/39, 40; 260/371, 260/372, 378, 380, 381

[56] References Cited
UNITED STATES PATENTS

| | | | |
|---|---|---|---|
| 3,510,243 | 5/1970 | Seuret et al. | 8/39 |
| 3,486,837 | 12/1969 | Neef et al. | 8/39 |
| 3,005,833 | 10/1961 | Gutzwiller et al. | 8/39 X |
| 3,576,015 | 4/1971 | Genta | 260/371 |
| 3,210,383 | 10/1965 | Ferrari | 260/380 |
| 2,274,751 | 3/1942 | Sowter et al. | 8/173 |

FOREIGN PATENTS OR APPLICATIONS
1,217,380  12/1970  Great Britain

OTHER PUBLICATIONS
White, ADR, 6-31-67, p. 18-24.

Primary Examiner—George F. Lesmes
Assistant Examiner—Patricia C. Ives
Attorney—Plumley and Tyner

[57] ABSTRACT

Process for the continuous dyeing of synthetic fiber materials from organic solvents, characterised in that the fibre materials are impregnated with dyeing liquids which contain anthraquinone dyestuffs of formula

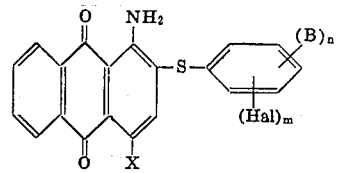

in which Hal represents chloro or bromo, X represents hydrogen, hydroxy, amino or acylamino and B represents alkyl, cycloalkyl or aralkyl and wherein $m$ is a number from 0 – 2 and $n$ a number from 0 – 3 and subjecting the fibre materials subsequently to a heat treatment.

The dyeings obtained are distinguished by a high dyestuff yield, very good build-up and excellent fastness properties, especially very good fastness to thermofixing, washing, rubbing and light.

12 Claims, No Drawings

CONTINUOUS DYEING OF POLYESTER FIBERS WITH WATER-IMMISCIBLE HALOGENATED HYDROCARBONS AND AMINO ANTHRAQUINONE DYESTUFFS

The subject of the invention is a process for the continuous dyeing of the synthetic fibre materials from organic solvents; the process is characterised in that the fibre materials are impregnated with dyeing liquors which contain anthraquinone dyestuffs of formula

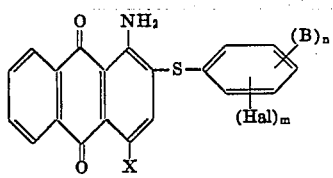

in which
Hal in particular denotes a chlorine or bromine atom,
X denotes a hydrogen atom, a hydroxyl, lower alkoxy, amino, lower alkylamino or cycloalkylamino group, an arylamino, especially phenylamino group which is optionally substituted by halogen atoms or trifluoromethyl groups, an arylsulphonylamino group, alkylsulphonylamino group, a radical of formula

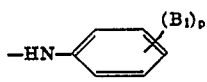

or a radical of formula

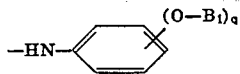

$m$ is a number from 0 – 2,
$n$ is a number from 0 – 3,
$p$ is a number from 0 – 3 and
$q$ is a number from 0 – 2, and
B and $B_1$ independently of one another represent a $C_1$ – $C_9$ alkyl, cycloalkyl or aralkyl radical.
with the proviso that the sum of the carbon atoms which are present in total in the substituent B or in the substituents B and $B_1$ is at least 1 and at most 9 and the sum of $n$ and $p$ and $q$ is at least 1, and that the fibre materials are subsequently subjected to a heat treatment.

As examples of B and $B_1$ there may be mentioned: as $C_1$ – $C_9$ alkyl radicals, the methyl, ethyl, propyl, isopropyl, iso-butyl, sec.-butyl, tert.-butyl, iso-amyl, sec.-pentyl, neopentyl, methyl-pentyl, dimethyl-butyl, methyl-hexyl, dimethyl-pentyl, trimethyl-butyl, iso-octyl, methyl-heptyl, dimethyl-hexyl, trimethyl-pentyl, tetra-methyl-butyl, iso-nonyl, dimethyl-heptyl and tri-methyl-hexyl radicals; as cycloalkyl radicals, the cyclohexyl and the methylcyclohexyl radicals and, as aralkyl radicals, especially the benzyl and the α,α-dimethyl-benzyl radical.

The dyestuffs used for the dyeing from organic solvents according to the invention are obtained according to processes which are in themselves known, for example by reaction of 1-amino-2-halogenanthraquinones, which may be appropriately substituted in the 4-position, with thiophenol and such thioaryl compounds as carry one or more alkyl, aralkyl or cycloalkyl radicals containing 1 – 9 carbon atoms, in the presence of inorganic or organic bases.

Possible organic solvents for the process according to the invention are those solvents which are essentially immiscible with water and of which the boiling points lie between 40° and 150° C, for example aromatic hydrocarbons, such as toluene or xylene, aliphatic halogenated hydrocarbons, especially chlorinated hydrocarbons, such as methylene chloride, chloroform, carbon tetrachloride, dichlorethane, trichlorethane, tetrachlorethane, dichloropropane, chlorobutane, dichlorobutane, as well as aliphatic fluoro- and fluorochlorohydrocarbons, such as perfluoro-n-hexane, 1,2,-2-trifluoro-trichlorethane and trifluoropentachloropropane, and aromatic chloro- and fluoro-hydrocarbons such as chlorobenzene, fluorobenzene, chlorotoluene and benzotrifluoride.

Tetrachlorethylene, trichlorethylene, 1,1,1-trichlorethane and 1,1,1-trichloropropane have proved particularly suitable. Mixtures of these solvents can also be used.

The synthetic fibre materials to be dyed according to the process of the invention are particularly fibre materials of polyesters, for example polyethylene terephthalates or polyesters of 1,4-bis-(hydroxymethyl)-cyclohexane and terephthalic acid, of cellulose triacetate, of synthetic polyamides, such as poly-ε-caprolactam, polyhexamethylenediamine adipate or poly-ω-amino-undecane-acid, of polyurethanes or of polyolefins. The fibre materials can be in the form of woven fabrics or knitted fabrics.

For dyeing, the dyestuffs to be used according to the invention are dissolved in the organic solvents which are essentially immiscible with water, or are added to these solvents in the form of solutions in solvents which are infinitely miscible with these solvents, such as alcohols, dimethylformamide, dimethylacetamide, dimethylsulphoxide or sulpholane, and the synthetic fibre materials are impregnated with the resulting clear dyestuff solutions, which can optionally further contain soluble non-ionic auxiliaries, for example the known surface-active oxethylation and propoxylation products of fatty alcohols, alkylphenols, fatty acid amides and fatty acids, in order to improve the uniformity of the dyeings. Thereafter the dyestuffs are fixed onto the fibre materials by a heat treatment. The heat treatment can consist of a brief dry heat treatment at 120° – 230°C, it being possible for the dry heat treatment optionally to be preceded by an intermediate drying, or can consist of a treatment of the fibre materials in superheated solvent vapour at 100°–150°C. Slight amounts of non-fixed dyestuff can be eluted by brief treatment with the cold organic solvent. It should be pointed out that mixtures of the dyestuffs to be used according to the invention sometimes provide a better colour yield than the individual dyestuffs and at time show an even better solubility in the organic medium.

With the aid of the process according to the invention it is possible to achieve dyeings from organic solvents onto synthetic fibre materials, which are distinguished by a high dystuff yield, very good build-up and excellent fastness properties, especially very good fastness to thermofixing, washing, rubbing and light. A further advantage of the dyestuffs to be used according to the invention is their high solubility in organic solvents, especially in tetrachlorethylene, trichlorethylene, 1,1,1-trichlorethane and 1,1,1-trichloropropane, which in particular makes it possible to carry out the dyeing even without the use of solubilising agents.

The parts given in the examples which follow are parts by weight.

EXAMPLE 1

A woven fabric of polyethyleneterephthalate fibres is impregnated at room temperature with a clear yellow-red solution which contains 10 parts of 1-amino-2-(4-isooctylphenylthio)-anthraquinone in 990 parts of tetrachlorethylene. After squeezing out to a weight increase of 60 percent, the woven fabric is dried for 1 minute at 80°C. Thereafter the dyestuff is fixed by heating the fabric for 45 seconds to 190° – 220°C. Subsequently, the slight amount of non-fixed dyestuff is eluted by brief treatment in cold tetrachlorethylene for 20 seconds. After drying, a clear yellow-red dyeing is obtained which is distinguished by its high dyestuff yield, very good build-up and excellent fastness properties, especially very good fastness to thermofixing, washing, rubbing and light.

Equivalent clear yellow-red dyeings were also obtained analogously on woven fabrics of (a) cellulose triacetate, (b) synthetic polyamides or polyurethanes and (c) polypropylene fibres; the only difference was that the thermosol treatment was carried out at 200° – 220°C for a), at 170° – 200°C for b) and at 120° – 150°C for c).

Equivalent dyeings were also obtained if the 990 parts of tetrachlorethylene were replaced by the same amount of one of the following solvents: methylene chloride, chloroform, carbon tetrachloride, dichlorethane, trichlorethane, trichlorethylene, tetrachlorethane, dichloropropane, 1,1,1-trichloropropane, chlorobutane, dichlorobutane, perfluoro-n-hexane, 1,2,2-trifluorotrichlorethane and trifluoropentachloropropane.

The dyestuff used had been manufactured as follows:

Twenty parts of 2-brom-1-aminoanthraquinone, 5.5 parts of potassium carbonate and 17 parts of 4-isooctyl-1-mercapto-benzene were heated to the boil in 40 parts of dimethylformamide until the dyestuff formation was complete. After cooling, the melt was introduced into an ice-water mixture. The precipitated dyestuff was filtered off, washed with water and dried in air. The dyestuff yield is practically quantitative.

EXAMPLE 2

A knitted fabric of polyhexamethylenediamine adipate filaments is impregnated at room temperature with a clear red-violet solution which contains 10 parts of 1-amino-2-(4-isooctylphenylthio)-4-hydroxyanthraquinone and 7 parts of nonylphenolheptaglycol-ether in 983 parts of tetrachlorethylene. After squeezing out to a weight increase of 60 percent the knitted fabric is dried for 1 minute at 80°C. Thereafter the dyestuff is fixed by heating the knitted fabric to 192°C for 45 seconds. Small amounts of non-fixed dyestuff are then eluted by brief treatment in cold tetrachlorethylene for about 20 seconds. After drying, a clear red-violet dyeing is obtained which is distinguished by its high dyestuff yield, very good build-up and excellent fastness properties, especially very good fastness to thermofixing, washing, rubbing and light.

An equivalent dyeing was also obtained if instead of the 983 parts of tetrachlorethylene the same amount of toluene, xylene, chlorobenzene, dichlorobenzene, fluorobenzene or benzotrifluoride was used.

The dyestuff used had been manufactured as described in Example 1, except that 21 parts of 4-hydroxy-2-brom-1-amino-anthraquinone were used instead of 20 parts of 2-brom-1-amino-anthraquinone.

EXAMPLE 3

A woven fabric of polypropylene fibres is impregnated at room temperature with a clear red-violet solution which contains 10 parts of the dyestuff named in Example 2 and 7 parts of nonylphenol-heptaglycolether in 983 parts of tetrachlorethylene. After squeezing out to a weight increase of 60 percent, the woven fabric is dried for 1 minute at 80°C. Thereafter the dyestuff is fixed by heating the woven fabric to 140°C for 30 seconds. Non-fixed amounts of dyestuff can be eluted by a brief treatment in cold solvent. A clear red-violet dyeing is obtained which is distinguished by high dyestuff yield, very good build-up and excellent fastness properties, especially very good fastness to thermofixing, washing, rubbing and light.

EXAMPLE 4

A woven fabric of poly-1,4-cyclohexanedimethylene terephthalate is impregnated at room temperature with a clear red-violet solution which contains 10 parts of 1-amino-2-(4-tert.-butylphenylthio)-4-hydroxyanthraquinone and 7 parts of nonylphenylheptaglycol-ether in 983 parts of tetrachlorethylene. After squeezing out to a weight increase of 60 percent, the woven fabric is dried for 1 minute at 80°C. Thereafter the dyestuff is fixed by heating the woven fabric to 190° – 220°C for 45 seconds. The small amount of non-fixed dyestuff is then eluted by brief treatment in cold tetrachlorethylene for 20 seconds. After drying, a clear red-violet dyeing is obtained, which is distinguished by its high dyestuff yield, very good build-up and excellent fastness properties, especially very good fastness to thermofixing, washing, rubbing and light.

The dyestuff used has been manufactured as follows:

Twenty parts of 4-hydroxy-2-brom-1-aminoanthraquinone, 6 parts of potassium carbonate and 11 parts of 4-tert.-butyl-1-mercapto-benzene in 40 parts of dimethylformamide were heated to the boil until the dyestuff formation had ended. After cooling, the melt was introduced into an ice-water mixture. The precipitated violet dyestuff powder was filtered off, washed with water and dried in air. The dyestuff yield is practically quantitative.

EXAMPLE 5

A woven fabric of cellulose triacetate fibres is impregnated at room temperature with a clear blue-violet solution which contains 10 parts of 1,4-diamino-2-(4-tert.-butylphenylthio)-anthraquinone in 990 parts of tetrachlorethylene. After squeezing out to a weight increase of 60 percent, the woven fabric is dried for 1 minute at 80°C. Thereafter the dyestuff is fixed by heating the woven fabric to 215°C for 1 minute. A clear, strong, reddish-tinged blue dyeing is obtained which is distinguished by high dyestuff yield, very good build-up and excellent fastness properties, especially very good fastness to thermofixing, washing, rubbing and light.

The dyestuff used had been manufactured as follows:

Twenty parts of 1,4-diamino-2-bromanthraquinone, 6 parts of potassium carbonate and 11 parts of 4-tert.-butyl-1-mercapto-benzene in 40 parts of dimethylformamide were heated to the boil until the dyestuff formation had ended. After cooling, the melt was introduced into an ice-water mixture. The precipitated reddish-tinged blue dyestuff powder was filtered off, washed with water and dried in air. The dyestuff yield is practically quantitative.

EXAMPLE 6

A woven fabric of anionically modified polyethylene terephthalate fibres (Dacron 64) is impregnated at room temperature with a clear blue-violet solution which contains 10 parts of 1,4-diamino-2-(4-methylphenylthio)-anthraquinone and 7 parts of nonylphenol-heptaglycol ether in 983 parts of tetrachlorethylene. After squeezing out to a weight increase of 60 percent, the woven fabric is dried for 1 minute at 80°C. Thereafter the dyestuff is fixed by heating the woven fabric to 190° – 220°C for 45 seconds. The small amount of non-fixed dyestuff is then eluted by brief rinsing with cold tetrachlorethylene. After drying, a clear, strong, reddish-tinged blue dyeing is obtained which is distinguished by its high dyestuff yield, very good build-up and excellent fastness properties, especially very good fastness to thermofixing, washing, rubbing and light.

EXAMPLE 7

A woven fabric of anionically modified polyamide fibres (Nylon T 844) is impregnated at room temperature with a clear blue solution which contains 10 parts of 1-amino-2-(4-tert.-butylphenylthio)-4-cyclohexylamino-anthraquinone and 7 parts of nonylphenol-heptaglycol-ether in 983 parts of tetrachlorethylene. After squeezing out to a weight increase of 60 percent the woven fabric is dried for 1 minute at 80°C and the dyestuff is fixed by heating the woven fabric to 192°C for 1 minute. A clear blue dyeing is obtained which is distinguished by high dyestuff yield, very good build-up and excellent fastness properties, especially very good fastness to thermofixing, washing, rubbing and light.

The dyestuff used had been manufactured as follows:

25.2 parts of 1amino-2-bromo-4-cyclohexylamino-anthraquinone, 6 parts of potassium carbonate and 11 parts of 4-tert.-butyl-1-mercapto-benzene in 45 parts of dimethylformamide were heated to the boil until the dyestuff formation had ended. After cooling, the melt was introduced into an ice-water mixture. The precipitated blue dyestuff powder was filtered off, washed with water and dried in air. The dyestuff yield is almost quantitative.

EXAMPLE 8

A woven fabric of polyethylene terephthalate fibres is impregnated at room temperature with a clear blue solution which contains 5 parts of 1,4-diamino-2-(4-tert.-butylphenylthio)-anthraquinone and 5 parts of 1-amino-2-(4-tert.-butylphenylthio)-4-(4-methylphenylamino)-anthraquinone in 990 parts of 1,1,1-trichlorethane. After squeezing out to a weight increase of 60 percent the dyestuff is fixed by treating the woven fabric with superheated 1,1,1-trichlorethane vapour at 140°C for 45 seconds. Thereafter the small amount of non-fixed dyestuff is eluted by brief rinsing in cold 1,1,1-trichlorethane. After drying, a reddish-tinged blue dyeing is obtained which is distinguished by its high dyestuff yield, very good build-up and excellent fastness properties.

EXAMPLE 9

A woven fabric of poly-1,4-cyclohexanedimethylene terephthalate is impregnated at room temperature with a clear red-violet solution which contains 10 parts of 1-amino-2-(4-iso-propylphenylthio)-4-hydroxy-anthraquinone in 990 parts of tetrachlorethylene. After squeezing out to a weight increase of 60 percent the dyestuff is fixed by treating the woven fabric with superheated tetrachlorethylene vapour at 150°C for 35 seconds. The small amount of non-fixed dyestuff is then eluted by brief rinsing in cold tetrachlorethylene. After drying, a clear red-violet dyeing is obtained which is distinguished by its high dyestuff yield, very good build-up and excellent fastness properties.

Strong dyeings on woven fabrics of polyester, triacetate, polyamide, polyurethane and polyolefin fibres, having excellent fastness properties, were also obtained if instead of the dyestuffs indicated in Examples 1 – 9 the same amount of one of the dyestuffs indicated in the table below was used. The resulting colour shades are given in the last column.

| Example | Dyestuff | Colour Shade |
|---|---|---|
| 10 | 1-amino-2-(4-tert.-butylphenylthio)-anthraquinone | yellow-red |
| 11 | 1-amino-2-(2,6-diethylphenylthio)-anthraquinone | yellow-red |
| 12 | 1-amino-2-(4-cyclohexylphenylthio)-anthraquinone | yellow-red |
| 13 | 1-amino-2-(2-cyclohexylphenylthio)-anthraquinone | yellow-red |
| 14 | 1-amino-2-(4-methylphenylthio)-anthraquinone | yellow-red |
| 15 | 1-amino-2-(2-methylphenylthio)-4-hydroxy-anthraquinone | red-violet |
| 16 | 1-amino-2-(4-isononylphenylthio)-4-hydroxy-anthraquinone | red-violet |
| 17 | 1-amino-2-(4-cyclohexylphenylthio)-4-hydroxy-anthraquinone | red-violet |
| 18 | 1-amino-2-(2-cyclohexylphenylthio)-4-hydroxy-anthraquinone | red-violet |
| 19 | 1-amino-2-(4-isohexylphenylthio)-4-hydroxy-anthraquinone | red-violet |
| 20 | 1-amino-2-(3,5-diisopropylphenylthio)-4-hydroxy-anthraquinone | red-violet |
| 21 | 1-amino-2-(4-isoamylphenylthio)-4-hydroxy-anthraquinone | red-violet |
| 22 | 1-amino-2-(4-benzylphenylthio)-4-hydroxy-anthraquinone | red-violet |
| 23 | 1-amino-2-[4-(2-phenylpropyl-(2))-phenylthio]-4-hydroxy-anthraquinone | red-violet |
| 24 | 1-amino-2-(4-cyclohexyl-2-methylphenylthio-4-hydroxy-anthraquinone | red-violet |
| 25 | 1-amino-2-(2,4,6-triethylphenylthio)-4-hydroxy-anthraquinone | red-violet |
| 26 | 1-amino-2-(4-chlor-3-isooctylphenylthio)-4-hydroxy-anthraquinone | red-violet |
| 27 | 1-amino-2-(2-brom-4-isooctylphenylthio)-4-hydroxy-anthraquinone | red-violet |
| 28 | 1-amino-2-(2,6-dichlor-4-isononylphenylthio)-4-hydroxy-anthraquinone | red-violet |
| 29 | 1-amino-2-(2,6-dibrom-4-isooctylphenylthio)-4-hydroxy-anthraquinone | red-violet |
| 30 | 1-amino-2-(4-tert.-butylphenylthio)-4-methoxy-anthraquinone | yellow-red |
| 31 | 1-amino-2-(4-ethylphenylthio)-4-ethoxy-anthraquinone | yellow-red |
| 32 | 1-amino-2-(4-methylphenylthio)-4-n-propoxy-anthraquinone | yellow-red |
| 33 | 1-amino-2-(2-methylphenylthio)-4-n-butoxy-anthraquinone | yellow-red |
| 34 | 1,4-diamino-2-(4-isooctylphenylthio)-anthraquinone | reddish-tinged blue |
| 35 | 1,4-diamino-2-(2-methylphenylthio)-anthraquinone | reddish-tinged blue |
| 36 | 1,4-diamino-2-isopropylphenylthio)-anthraquinone | reddish-tinged blue |
| 37 | 1,4-diamino-2-(4-cyclohexylphenylthio)-anthraquinone | reddish-tinged blue |
| 38 | 1,4-diamino-2-(4-benzylphenylthio)- | reddish-tinged |

| # | Compound | Color |
|---|---|---|
| 39 | 1,4-diamino-2-[4-(2-phenylpropyl-(2))-phenylthio]-anthraquinone | reddish-tinged blue |
| 40 | 1-amino-2-(4-tert.-butylphenylthio)-4-methylamino-anthraquinone | blue |
| 41 | 1-amino-2-(4-methylphenylthio)-4-ethylamino-anthraquinone | blue |
| 42 | 1-amino-2-(2-methylphenylthio)-4-n-butylamino-anthraquinone | blue |
| 43 | 1-amino-2-(4-methylphenylthio)-4-cyclohexylamino-anthraquinone | blue |
| 44 | 1-amino-2-(4-tert.-butylphenylthio)-4-(4-methylcyclohexylamino)-anthraquinone | blue |
| 45 | 1-amino-2-(2-methylphenylthio)-4-(2,4,6-trimethylcyclohexylamino)-anthraquinone | blue |
| 46 | 1-amino-2-(4-tert.-butylphenylthio)-4-(4-chlorophenylamino)-anthraquinone | blue |
| 47 | 1-amino-2-(4-isooctylphenylthio)-4-(3-bromophenylamino)-anthraquinone | blue |
| 48 | 1-amino-2-(4-isononylphenylthio)-4-(2,5-dichlorophenylamino)-anthraquinone | blue |
| 49 | 1-amino-2-(4-isooctylphenylthio)-4-(3-trifluoromethylphenylamino)-anthraquinone | blue |
| 50 | 1-amino-2-(4-isopropylphenylthio)-4-(4-fluorophenylamino)-anthraquinone | blue |
| 51 | 1-amino-2-(4-tert.-butylphenylthio)-4-tosylamino-anthraquinone | violet |
| 52 | 1-amino-2-(4-isooctylphenylthio)-4-tosylamino-anthraquinone | violet |
| 53 | 1-amino-2-(4-isononylphenylthio)-4-phenylsulphonylamino-anthraquinone | violet |
| 54 | 1-amino-2-phenylthio-4-(4-tert.-butylphenylamino)-anthraquinone | blue |
| 55 | 1-amino-2-(4-methylphenylthio)-4-(2-ethylphenylamino)-anthraquinone | reddish-tinged blue |
| 56 | 1-amino-2-(4-tert.-butylphenylthio)-4-(2,6-dimethylphenylamino)-anthraquinone | reddish-tinged blue |
| 57 | 1-amino-2-(2-methylphenylthio)-4-(2-isopropylphenylamino)-anthraquinone | reddish-tinged blue |
| 58 | 1-amino-2-(4-methylphenylthio)-4-(2,3,5-trimethyl-phenylamino)-anthraquinone | reddish-tinged blue |
| 59 | 1-amino-2-(4-methylphenylthio)-4-(4-n-butylphenylamino)-anthraquinone | blue |
| 60 | 1-amino-2-phenylthio-4-(4-isooctyl-phenylamino)-anthraquinone | blue |
| 61 | 1-amino-2-(4-n-butylphenylthio)-4-(2,4,6-triethylphenylamino)-anthraquinone | reddish-tinged blue |
| 62 | 1-amino-2-(4-isooctylphenylthio)-4-[3,5-bis-(trifluoromethyl)-phenylamino]-anthraquinone | blue |
| 63 | 1-amino-2-(4-methylphenylthio)-4-(4-cyclohexylphenylamino)-anthraquinone | blue |
| 64 | 1-amino-2-(2-methylphenylthio)-4-(2-methyl-4-cyclohexylphenylamino)-anthraquinone | reddish-tinged blue |
| 65 | 1-amino-2-(4-tert.-butylphenylthio)-4-(5,6,7,8-tetrahydro-2-naphthylamino)-anthraquinone | blue |
| 66 | 1-amino-2-(4-tert.-butylphenylthio)-4-(5,6,7,8-tetrahydro-1-naphthylamino)-anthraquinone | reddish-tinged blue |
| 67 | 1-amino-2-(4-tert.-butylphenylthio)-4-(4-methoxyphenylamino)-anthraquinone | blue |
| 68 | 1-amino-2-(4-tert.-butylphenylthio)-4-(2,4-dimethoxyphenylamino)-anthraquinone | blue |
| 69 | 1-amino-2-(4-isooctylphenylthio)-4-(4-ethoxyphenylamino)-anthraquinone | blue |
| 70 | 1-amino-2-phenylthio-4-(4-isoamyloxyphenylamino)-anthraquinone | blue |
| 71 | 1-amino-2-(4-methylphenylthio)-4-(3-isobutoxyphenylamino)-anthraquinone | blue |
| 72 | 1-amino-2-(2-methylphenylthio)-4-(4-n-propoxyphenylamino)-anthraquinone | blue |
| 73 | 1-amino-2-phenylthio-4-(3-isoamyloxyphenylamino)-anthraquinone | blue |
| 74 | 1-amino-2-(4-tert.-butylphenylthio)-4-(2,5-diethoxyphenylamino)-anthraquinone | blue |
| 75 | 1-amino-2-(4-tert.-butylphenylthio)-4-(4-β-methoxyethoxy-phenylamino)-anthraquinone | blue |
| 76 | 1-amino-2-(4-methylphenylthio)-4-(4-n-butoxyphenylamino)-anthraquinone | blue |
| 77 | 1-amino-2-(4-tert.-butylphenylthio)-4-(3,4-dimethoxyphenylamino)-anthraquinone | blue |
| 78 | 1-amino-2-phenylthio-4-(4-isooctyloxy-phenylamino)-anthraquinone | blue |
| 79 | 1-amino-2-phenylthio-4-[4-(2,2-dimethyl-butoxy)-phenylamino]-anthraquinone | blue |
| 80 | 1-amino-2-phenylthio-4-[3-(2-ethyl-hexoxy)-phenylamino]-anthraquinone | blue |
| 81 | 1-amino-2-(4-isooctylphenylthio)-4-methylsulphonylamino-anthraquinone | violet |
| 82 | 1-amino-2-(4-isooctylphenylthio)-4-ethylsulphonylamino-anthraquinone | violet |
| 83 | 1-amino-2-(2-isopropyl-3-methyl-phenylthio)-anthraquinone | yellow-red |
| 84 | 1-amino-2-(2-isopropyl-3-methylphenyl-thio)-4-hydroxy-anthraquinone | red-violet |
| 85 | 1-amino-2-(2-isopropyl-4-methylphenyl-thio)-4-hydroxy-anthraquinone | red-violet |
| 86 | 1,4-diamino-2-(2-isopropyl-3-methyl-phenylthio)-anthraquinone | reddish-tinged blue |
| 87 | 1-amino-2-(2-isopropyl-3-methylphenyl-thio)-4-(methyl-phenylamino)-anthraquinone | blue |
| 88 | 1-amino-2-(2-isopropyl-3-methylphenyl-thio)-4-tosylamino-anthraquinone | violet |

We claim:

1. Process for the continuous dyeing of synthetic polyester fiber material comprising the steps of
A. impregnating the fiber material with a non-aqueous dyeing liquor said liquor consisting essentially of an organic solvent and an anthraquinone dyestuff, said organic solvent consisting of water-immiscible halogenated hydrocarbon boiling between 40° and 150°C, said anthraquinone dyestuff having the formula

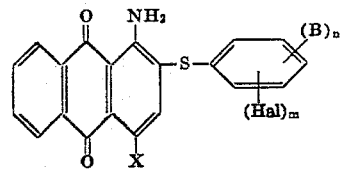

in which Hal is chlorine or bromine; X is hydrogen, hydroxyl, lower alkoxy, amino, lower alkylamino, cycloalkylamino, arylamino substituted by halogen or trifluoromethyl, arylsulfonylamino, alkyl-sulfonylamino,

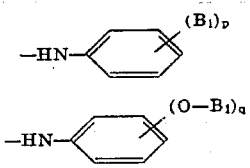

$m$ is a number from 0–2;
$n$ is a number from 0–3;
$p$ is a number from 0–3;
$q$ is a number from 0–2;
B and $B_1$ independently of one another are $C_1$–$C_9$-alkyl, cycloalkyl or aralkyl; with the proviso that the sum of the carbon atoms present in the substituent B or the substituents B and $B_1$ is 1 to 9; the sum of n and p and q is at least 1; and
B. subjecting the fiber material to a heat-treatment to fix said dyestuff on said fiber material.

2. The process of claim 1 in which said anthraquinone dyestuff has the formula

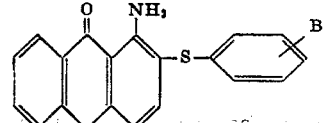

in which B is $C_1 - C_9$-alkyl-, cycloalkyl- or aralkyl.

3. The process of claim 1 in which said anthraquinone dyestuff has the formula

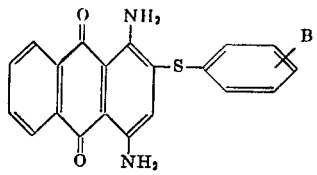

in which B is $C_1 - C_9$-alkyl, cycloalkyl or aralkyl.

4. The process of claim 1 in which said anthraquinone dyestuff has the formula

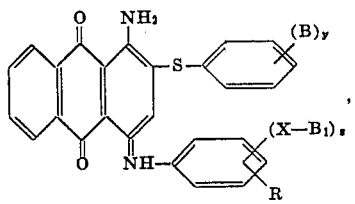

in which
X is a direct bond or —O—;
R is hydrogen, halogen or trifluoromethyl;
y is 0 or 1; and
z is a number from 0 - 3.

5. The process of claim 1 in which said anthraquinone dyestuff has the formula

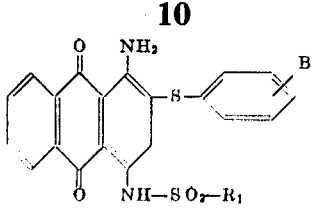

in which
B is $C_1 - C_9$-alkyl, cycloalkyl or aralkyl;
$R_1$ is phenyl, phenyl substituted with lower alkyl or lower alkyl.

6. The process of claim 1 in which said anthraquinone dyestuff is soluble in said water-immiscible halogenated hydrocarbon.

7. The process of claim 6 in which the dyed material is subjected to a subsequent step of (C) rinsing with water-immiscible organic solvent in which said anthraquinone dyestuff is soluble.

8. The process of claim 1 in which said water-immiscible halogenated hydrocarbon is an aliphatic chlorohydrocarbon having a boiling point of between 40 and 150°C.

9. The process of claim 1 in which said water-immiscible organic solvent is selected from the group consisting of tetrachloroethylene, trichloroethylene, 1,1,1-trichloroethane, 1,1,1-trichloropropane and mixtures thereof.

10. The process of claim 1 in which said heat treatment is conducted under dry heat conditions at a temperature of 120°-230°C.

11. The process of claim 1 in which said heat treatment is conducted in superheated solvent vapor at 100°-150°C.

12. The dyed fiber produced by the process of claim 1.

* * * * *